(12) United States Patent
Rice

(10) Patent No.: X6240
(45) Date of Patent: Nov. 11, 1830

(54) CIDER MILL

(76) Inventor: Charles Rice

Charles Rice of Barre Worcester Co Massachusetts
Letters Patent.

The Schedule referred to in these Letters Patent and making part of the same containing a description in the words of the said Charles Rice himself, of his improvement in Cider Mills.

Be it known that I Charles Rice of Barre in the County of Worcester & State of Massachusetts have made an improvement in Cider Mills which is described as follows, This Cider Mill consists of the following principal parts. Viz. 1. the Carriage with the wheels. 2. The rack to receive the pumice. 3 the Cylinder and hopper. 4. The Press and screws. 5. the Gearing - 1 <u>The Carriage with the wheels</u>. The Carriage is about 10 feet long. 5 1/2 feet wide and about 4 feet high framed together and fastened by screws. There are four wheels. the two forward about 3 feet. & the two hinder about 3 1/2 feet diameter. on which the carriage rests and by means of which it is removed from place to place.

2. <u>The Rack to receive the pumice</u>. is made of staves or steads about 4 feet long and about 1 1/8 inch square and the rack may be either circular or rectangular placed perpendicularly. If circular the lower ends of the staves or steads are let into an opening on the floor of the carriage — with a hoop and rivets to bind them together at the top. If rectangular then the staves or steads may be fastened into the upper and lower part of the carriage. 3. <u>The Cylinder and Hopper</u>. The Cylinder is about 14 inches long and 8 inches diameter turning on gudgeons resting on two beams and directly over the Press to be hereafter described. On this Cylinder are 8 or 10 rows of points placed in a spiral direction and covering the Cylinder from side to side: In the hopper placed over the cylinder is an iron bar ~~fixed~~ which comes nearly but not quite in contact with the points of the cylinder. 4. <u>the Press and screws</u>. The Press is formed by 4 screws about 6 feet long and 1 3/4 inch diameter, with a follower attached to their lower ends, this follower is made of two beams with screws passing directly through them. The floor of the follower consists of loose pieces, which can be taken out at pleasure to remove the pumice. On the top of the rack are placed strong loose planks to resist the pressure on the pumice. On the top of each screw is a nut working against [illegible] resting on the [illegible] of the [illegible]. A sliding board is placed at the bottom of the [illegible] on which the cider falls and is collected.

3. The Bearing is similar to that in common use and is adapted to the purpose of the mill. This Cider mill may be worked by animal, water or steam power.

Operation. The apples are put into the hopper: the mill is set in motion the apples are ground by the Cylinder: the pumice descends into the press. upon the bars of the follower. the Planks being placed on the top of the rack. the screws are turned by a wrench which bring up the follower with the pumice against them. and thus the juice of the apples is pressed out. The juice falls down and is collected on the sliding board from whence it runs into a trough or tub, the pumice is taken out by removing the bars of the follower The Invention here claimed. and for which Letters Patent are desired is the Press. the Rack. and the arrangement of the different parts of the mill as above described. Further to illustrate my invention I refer the model and drawing of the same deposited in the Patent Office. In testimony that the forgoing is a true description of my Invention I have signed my name before two witnesses and made oath to the same at the City of Washington this 3d day of November 1830.

Exd.
W.J.C.

Witnesses:
William P Elliot
Charles M. Keller

Charles Rice (720 words)